United States Patent
Liu et al.

(10) Patent No.: US 9,767,081 B2
(45) Date of Patent: Sep. 19, 2017

(54) METHOD AND APPARATUS FOR DISPLAYING A WEBPAGE IN A MOBILE TERMINAL

(71) Applicant: BAIDU ONLINE NETWORK TECHNOLOGY (BEIJING) CO., LTD., Beijing (CN)

(72) Inventors: Chengcheng Liu, Beijing (CN); Zhijie Wang, Beijing (CN); Qian Wang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 310 days.

(21) Appl. No.: 14/412,221

(22) PCT Filed: Nov. 30, 2012

(86) PCT No.: PCT/CN2012/085668
§ 371 (c)(1),
(2) Date: Dec. 31, 2014

(87) PCT Pub. No.: WO2014/008736
PCT Pub. Date: Jan. 16, 2014

(65) Prior Publication Data
US 2015/0186340 A1    Jul. 2, 2015

(30) Foreign Application Priority Data

Jul. 9, 2012  (CN) .......................... 2012 1 0238158

(51) Int. Cl.
| G06F 17/22 | (2006.01) |
| G06F 17/30 | (2006.01) |
| G06F 17/21 | (2006.01) |

(52) U.S. Cl.
CPC ........ *G06F 17/2235* (2013.01); *G06F 17/211* (2013.01); *G06F 17/2247* (2013.01); *G06F 17/30905* (2013.01)

(58) Field of Classification Search
None
See application file for complete search history.

(56) References Cited

U.S. PATENT DOCUMENTS

| 8,799,777 B1 * | 8/2014 | Lee ..................... G06F 3/04886 715/702 |
| 2004/0056848 A1 | 3/2004 | Sasaki |

(Continued)

FOREIGN PATENT DOCUMENTS

| CN | 1698052 | 11/2005 |
| CN | 101944104 | 1/2011 |

(Continued)

OTHER PUBLICATIONS

WIPO, International Search Report for PCT/CN2012/085668, Apr. 18, 2013.

*Primary Examiner* — Stephen Hong
*Assistant Examiner* — Sanchita Roy
(74) *Attorney, Agent, or Firm* — Hodgson Russ LLP

(57) ABSTRACT

A method and apparatus for displaying a webpage on a mobile terminal are provided. The method comprises steps of: identifying a touch hot region in the webpage; marking various kinds of elements in the touch hot region; and changing displaying modes of the various kinds of elements in the touch hot region when a user touches the touch hot region. According to the method displaying a webpage on a mobile terminal, by marking the touch hot region, a form of the elements in the touch hot region is changed when the user browses or touches it, which facilitates the touch and (Continued)

interaction of the user, and improves a usability of the mobile device and a user experience.

12 Claims, 1 Drawing Sheet

(56) References Cited

U.S. PATENT DOCUMENTS

| | | | |
|---|---|---|---|
| 2005/0289121 A1* | 12/2005 | Nakamura | G06F 17/30905 |
| 2011/0035701 A1 | 2/2011 | Williams et al. | |
| 2012/0092340 A1* | 4/2012 | Sarnoff | G06T 11/203 |
| | | | 345/420 |
| 2012/0092355 A1 | 4/2012 | Yamamoto et al. | |
| 2012/0117451 A1 | 5/2012 | You | |

FOREIGN PATENT DOCUMENTS

| | | |
|---|---|---|
| CN | 102024028 | 4/2011 |
| CN | 102147702 | 8/2011 |
| CN | 102236649 | 11/2011 |
| CN | 102314436 | 1/2012 |
| CN | 102455871 | 5/2012 |
| JP | 2004140811 | 5/2004 |
| JP | 2012104095 | 5/2012 |

* cited by examiner

METHOD AND APPARATUS FOR DISPLAYING A WEBPAGE IN A MOBILE TERMINAL

CROSS REFERENCE TO RELATED APPLICATION

This U.S. application claims priority under 35 U.S.C 371 to, and is a U.S. National Phase application of, the International Patent Application No. PCT/CN2012/085668, filed Nov. 30, 2012, which claims the benefit of prior Chinese Application No. 201210238158.3 filed Jul. 9, 2012. The entire contents of the before-mentioned patent applications are incorporated by reference as part of the disclosure of this U.S. application.

FIELD

Embodiments of the present invention generally relate to a webpage transcoding of a website, and more particularly, to a method and apparatus for displaying a webpage on a mobile terminal.

BACKGROUND

Nowadays, mobile terminals become more and more popular and a webpage designed for a desktop device needs to be converted to be browsed on various mobile terminals. However, some webpages have a compact webpage structure after being converted, which causes difficulties in reading and interaction, and thus some touch hot regions (i.e., interaction or touch dense regions) need to be optimized.

In related art, mainly by converting an original webpage into a fixed webpage, touchable interactive elements can be arranged in a not too compact manner. However, the related art still has at least following defects.

(1) A width of the webpage can just be adapted to one kind of mobile terminals with a screen under a certain size, not to various kinds of mobile terminals.

(2) A page layout of the webpage cannot be adjusted automatically and a corresponding change cannot be performed thereon according to a change of the screen of the mobile terminal.

SUMMARY

Embodiments of the present invention seek to solve at least one of the problems existing in the related art to at least some extent.

Accordingly, a first objective of the present disclosure is to provide a method for displaying a webpage on a mobile terminal.

A second objective of the present disclosure is to provide an apparatus for displaying a webpage on a mobile terminal.

A third objective of the present disclosure is to provide a non-transitory computer readable storage medium.

In order to achieve above objectives, according to embodiments of a first aspect of the present disclosure, the method for displaying a webpage on a mobile terminal comprises steps of: identifying a touch hot region in the webpage; marking various kinds of elements in the touch hot region; and changing displaying modes of the various kinds of elements in the touch hot region when a user touches the touch hot region.

With the method for displaying a webpage on a mobile terminal according to embodiments of the present disclosure, by marking the touch hot region, a form of the elements in the touch hot region is changed when the user browses or touches it, which facilitates the touch and interaction of the user, and improves a usability of the mobile device and a user experience.

In order to achieve the above objectives, according to embodiments of a second aspect of the present disclosure, the apparatus for displaying a webpage on a mobile terminal comprises: an identifying module, configured to identify a touch hot region in the webpage; a marking module, configured to mark various kinds of elements in the touch hot region; and a changing module, configured to change displaying modes of the various kinds of elements in the touch hot region when a user touches the touch hot region.

With the apparatus for displaying a webpage on a mobile terminal according to embodiments of the present disclosure, by identifying the touch hot region via the identifying module and marking the touch hot region via the marking module, a form of the elements is changed by the changing module in the touch hot region when the user touches it, which facilitates the touch and interaction of the user, and improves a usability of the mobile device and a user experience.

In order to achieve the above objectives, embodiments of a third aspect of the present disclosure provide a non-transitory computer readable storage medium. The non-transitory computer readable storage medium comprises a computer program for executing the method for displaying a webpage on a mobile terminal according to the first aspect of the present disclosure, when running on a computer.

Additional aspects and advantages of embodiments of present invention will be given in part in the following descriptions, become apparent in part from the following descriptions, or be learned from the practice of the embodiments of the present invention.

BRIEF DESCRIPTION OF THE DRAWINGS

These and other aspects and advantages of embodiments of the present invention will become apparent and more readily appreciated from the following descriptions made with reference to the accompanying drawings, in which.

DETAILED DESCRIPTION

Figure 1:
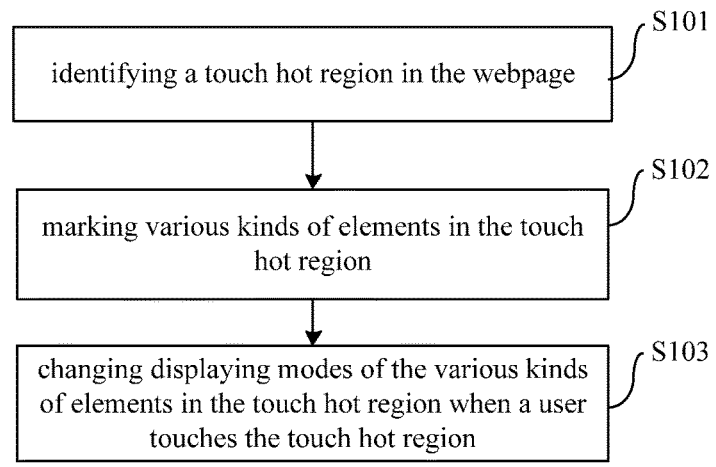
FIG. 1 is a flow chart of a method for displaying a webpage on a mobile terminal according to an embodiment of the present disclosure.

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

Referring to the following descriptions and drawings, these and other aspects of the embodiments of the present disclosure will be apparent. In these descriptions and drawings, some specific approaches of the embodiments of the present disclosure are provided, so as to show some ways to perform the principle of the embodiments of the present disclosure, however it should be understood that the embodiment of the present disclosure is not limited thereby.

Instead, the embodiments of the present disclosure comprise all the variants, modifications and their equivalents within the spirit and scope of the present disclosure as defined by the claims.

A method for displaying a webpage on a mobile terminal will be described in the following with reference to attached drawings.

The method for displaying a webpage on a mobile terminal includes: identifying a touch hot region in the webpage; marking various kinds of elements in the touch hot region; and changing displaying modes of the various kinds of elements in the touch hot region when a user touches the touch hot region.

FIG. 1 is a flow chart of a method for displaying a webpage on a mobile terminal according to an embodiment of the present disclosure.

As shown in FIG. 1, the method for displaying a webpage on a mobile terminal according to embodiments of the present disclosure includes following steps.

At step S101, a touch hot region in the webpage is identified.

Specifically, a region where the touchable interactive elements are arranged in a compact manner is identified according to markups of an interactive element and a link element in the webpage.

At step S102, various kinds of elements in the touch hot region are marked.

Specifically, the identified touch hot region is marked.

At step S103, displaying modes of the various kinds of elements in the touch hot region are changed when a user touches the touch hot region.

Specifically, when the user browses or touches an interaction hot region, this region is enlarged or a space replacement is performed therein; when the user browses or touches a link hot region, an image in the link hot region is enlarged, words in this region are enlarged and spaces therebetween are enlarged, and a background button and a frame are added.

In an embodiment of the present disclosure, identifying a touch hot region in the webpage includes steps as followed: a region in which a small-image link element or a short link element locates is identified as the touch hot region, if the small-image link element or the short link element exists and an element available to be output exists within a distance of 10 px around the small-image link element or the short link element; a region in which a small interactive element locates is identified as the touch hot region, if the small interactive element exists and an element available to be output exists within a distance of 10 px around the small interactive element; and a region in which two or more consecutive medium-sized interactive elements, two or more consecutive image link elements or two or more consecutive text link elements locate are identified as the touch hot region, if the two or more consecutive medium-sized interactive elements, the two or more consecutive image link elements or the two or more consecutive text link elements exist.

Specifically, the identification is performed via a layout of the webpage. If a position coordinate of other element available to be output exists within the distance of 10 px around the small-image link element or the short link element and the interaction is performed in a region thereof, an incorrect region may be touched, and thus a region in which the small-image link element or the short link element locates is identified as the touch hot region; if the position coordinate of other element available to be output exists within the distance of 10 px around the small interactive element and the interaction is performed in a region thereof, two elements may mean to be output simultaneously, and thus the region in which the small interactive element locates is identified as the touch hot region; if the two or more consecutive medium-sized interactive elements, the two or more consecutive image link elements or the two or more consecutive text link elements exist in the layout of the webpage consecutively, an incorrect touch may occur and display may be overlapped with each other in a region thereof, and thus the region in which the two or more consecutive medium-sized interactive elements, the two or more consecutive image link elements or the two or more consecutive text link elements locate are identified as the touch hot region.

In an embodiment of the present disclosure, if a width of the interactive element is less than 32 px, the interactive element is defined as the small interactive element; if the width of the interactive element is between 32 px and 120 px, the interactive element is defined as the medium-sized interactive element; if a width of the image link element is less than 32 px, the image link element is defined as the small-image link element; if the width of the image link element is between 32 px and 120 px, the image link element is defined as a medium-sized image link element; if a text length of the text link element is less than or equal to 6 bytes, the text link element is defined as a short text link element; if the text length of the text link element is between 6 bytes and 10 bytes, the text link element is defined as a medium-sized text link element.

Specifically, the identification is performed via a tag in the webpage. If there is a tag such as an input interaction tag, a button interaction tag and a select interaction tag, the corresponding element is the interactive element, and then the identification is further performed according to a width property of the element in the tag; if the width of the interactive element is less than 32 px, the interactive element is defined as the small interactive element; if the width of the interactive element is between 32 px and 120 px, the interactive element is defined as the medium-sized interactive element. If an a tag is identified, the corresponding element is the link element, and then a property of the link element is determined; if an interior of the a tag is an image and the width of the image link element is less than 32 px, the image link element is defined as the small-image link element; if the width of the image link element is between 32 px and 120 px, the image link element is defined as a medium-sized image link element; if the interior of the a tag is a text and the text length of the text link element is less than or equal to 6 bytes, the text link element is defined as the short text link element; if the text length of the text link element is between 6 bytes and 10 bytes, the text link element is defined as the medium-sized text link element.

In an embodiment of the present disclosure, the widths of the interactive element, the image link element and the text link element on the webpage are calculated respectively according to tags of the interactive element, the image link element and the text link element in the touch hot region.

Specifically, the interactive element and the link element are identified by identifying the interactive tag such as the input interactive tag, the button interactive tag, the select interactive tag and the a tag, and it is determined whether it is the image link element or the text link element via a main body inside the tag, and then the widths of the interactive element, the image link element and the text link element on the webpage are determined according to the width properties set in the tag.

In an embodiment of the present disclosure, marking various kinds of elements in the touch hot region includes: marking two or more consecutive short text link elements contained in consecutive bytes less than 50 bytes, two or more consecutive short text link elements, two or three consecutive image link elements, four or more consecutive small-image link elements, and four or more consecutive medium-sized image link elements or the interactive elements contained in consecutive bytes more than or equal to 50 bytes respectively.

Specifically, the two or more consecutive short text link elements contained in the consecutive bytes less than 50 bytes are treated as a group to mark, and the two or more consecutive short text link elements contained in the consecutive bytes more than or equal to 50 bytes are treated as another group to mark, and the two or three consecutive image link elements contained in the consecutive bytes more than or equal to 50 bytes are treated as yet another group to mark, and the four or more consecutive small-image link elements contained in the consecutive bytes more than or equal to 50 bytes are treated as still yet another group to mark and the four or more consecutive medium-sized image link elements or the interactive elements contained in the consecutive bytes more than or equal to 50 bytes are treated as a last group to mark.

In an embodiment of the present invention, changing displaying modes of the various kinds of elements in the touch hot region when a user touches the touch hot region includes steps as followed: for the two or more consecutive short text link elements contained in the consecutive bytes less than 50 bytes, the two or three consecutive image link elements or the interactive elements: the two or more consecutive short text link elements contained in the consecutive bytes less than 50 bytes, the two or three consecutive image link elements or the interactive elements are enlarged; a margin of each of the two or more consecutive short text link elements contained in the consecutive bytes less than 50 bytes, of each of the two or three consecutive image link elements or of each of the interactive elements is increased; and the layout of the two or more consecutive short text link elements contained in the consecutive bytes less than 50 bytes, the two or three consecutive image link elements or the interactive elements is adjusted.

Specifically, for the two groups of marked elements, the two or more consecutive short text link elements contained in the consecutive bytes less than 50 bytes and the two or three consecutive image link elements or the interactive elements, firstly main bodies of the link images or interactive documents inside the tags of the elements are enlarged, then the margin of each of elements is increased in the page layout so as to increase the distances with respect to other elements, and then the layout of the elements is adjusted to adapt the layout thereof to the enlarged elements and the increased margins.

In an embodiment of the present disclosure, changing displaying modes of the various kinds of elements in the touch hot region when a user touches the touch hot region includes steps as followed: for the two or more consecutive short text link elements or the four or more consecutive small-image link elements contained in the consecutive bytes more than or equal to 50 bytes respectively: important links in the two or more consecutive short text link elements or the four or more consecutive small-image link elements contained in the consecutive bytes more than or equal to 50 bytes are identified; the important links are displayed; other links are hidden; and an unfold button configured to unfold the other links and a hiding button configured to hide the other links are added.

Specifically, for the two groups of elements, the two or more consecutive short text link elements or the four or more consecutive small-image link elements contained in the consecutive bytes more than or equal to 50 bytes, firstly the identification is performed via the link a tag, then the important links inside the tag are obtained, and the important links are displayed solely. Furthermore, the other links are hidden or folded up by providing a hiding property thereto, and then the unfold button of the hidden links and the hiding button for displaying the hidden links are added, which may be used to control to hide or display the hidden links.

In an embodiment of the present disclosure, changing displaying modes of the various kinds of elements in the touch hot region when a user touches the touch hot region includes steps as followed: for the four or more consecutive medium-sized image link elements: the layout of the four or more consecutive medium-sized image link elements is adjusted; a slidable space is added; and other medium-sized image link elements which exceed a display space of a current page are displayed by sliding.

Specifically, for this group of elements, the four or more consecutive medium-sized image link elements, the layout of the four or more consecutive medium-sized image link elements in the webpage is adjusted firstly, and the slidable space is added in the webpage for these image link elements to slide, and thus the image link elements which exceed a display space of the current page may slide down and be provided to the user via a sliding display.

With the method for displaying the webpage on the mobile terminal according to embodiments of the present disclosure, by marking the touch hot region, the elements in the touch hot region are changed when the user browses or touches it, which facilitates the touches and interaction of the user, and improves a usability of the mobile device and a user experience.

An apparatus for displaying a webpage on a mobile terminal according to embodiments of the present disclosure will be described in the following with reference to attached drawings.

The apparatus for displaying the webpage on the mobile terminal, includes an identifying module, configured to identify a touch hot region in the webpage; a marking module, configured to mark various kinds of elements in the touch hot region; and a changing module, configured to change displaying modes of the various kinds of elements in the touch hot region when a user touches the touch hot region.

Figure 2:
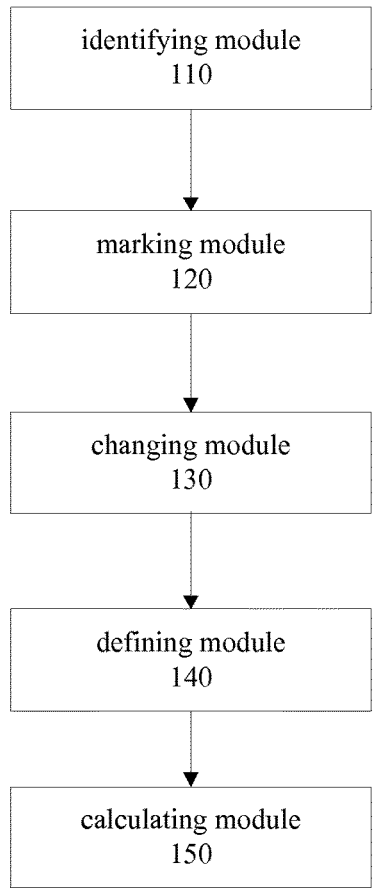
FIG. 2 is a schematic diagram of an apparatus for displaying a webpage on a mobile terminal according to an embodiment of the present disclosure.

FIG. 2 is a schematic diagram of an apparatus for displaying a webpage on a mobile terminal according to an embodiment of the present disclosure.

As shown in FIG. 2, the apparatus for displaying a webpage on a mobile terminal according to embodiments of the present disclosure includes an identifying module 110, a marking module 120, a changing module 130, a defining module 140 and a calculating module 150.

Specifically, the identifying module 110 is configured to identify a touch hot region in the webpage; the marking module 120 is configured to mark various kinds of elements in the touch hot region; and the changing module 130 is configured to change displaying modes of the various kinds of elements in the touch hot region when a user touches the touch hot region. The defining module 140 is configured to: define the interactive element as the small interactive element, if a width of the interactive element is less than 32 px;

define the interactive element as the medium-sized interactive element, if the width of the interactive element is between 32 px and 120 px; define the image link element as the small-image link element, if a width of the image link element is less than 32 px; define the image link element as a medium-sized image link element, if the width of the image link element is between 32 px and 120 px; define the text link element as a short text link element, if a text length of the text link element is less than or equal to 6 bytes and define the text link element as a medium-sized text link element, if the text length of the text link element is between 6 bytes and 10 bytes. The calculating module 150 is configured to calculate the widths of the interactive element, the image link element and the text link element on the webpage respectively according to tags of the interactive element, the image link element and the text link element in the touch hot region.

Further specifically, the identifying module 110 is configured to identify a region where the touchable interactive elements are arranged in a compact manner according to markups of an interactive element and a link element in the webpage. The marking module 120 is configured to mark the identified touch hot region. The changing module 130 is configured to enlarge the region or perform a space replacement therein when the user browses or touches an interaction hot region, and to enlarge an image in the link hot region, enlarge words in the region and spaces therebetween and add a background button and a frame when the user browses or touchs a link hot region.

The defining module 140 is configured to perform the identification via a tag in the webpage. If there is a tag such as an input interaction tag, a button interaction tag and a select interaction tag, the corresponding element is the interactive element, and then the identification is further performed according to a width property of the element in the tag; if the width of the interactive element is less than 32 px, the interactive element is defined as the small interactive element; if the width of the interactive element is between 32 px and 120 px, the interactive element is defined as the medium-sized interactive element. If an a tag is identified, the corresponding element is the link element, and then a property of the link element is determined; if an interior of the a tag is an image and the width of the image link element is less than 32 px, the image link element is defined as the small-image link element; if the width of the image link element is between 32 px and 120 px, the image link element is defined as a medium-sized image link element; if the interior of the a tag is a text and the text length of the text link element is less than or equal to 6 bytes, the text link element is defined as the short text link element; if the text length of the text link element is between 6 bytes and 10 bytes, the text link element is defined as the medium-sized text link element.

The calculating module 150 is configured to identify the interactive element and the link element by identifying the interactive tag such as the input interactive tag, the button interactive tag, the select interactive tag and the a tag, and to determine whether it is the image link element or the text link element via a main body inside the tag, and further to determine the widths of the interactive element, the image link element and the text link element on the webpage according to the width properties set in the tag.

In an embodiment of the present disclosure, the identifying module 110 is configured to identify a region in which a small-image link element or a short link element locates as the touch hot region, if the small-image link element or the short link element exists and an element available to be output exists within a distance of 10 px around the small-image link element or the short link element; identify a region in which a small interactive element locates as the touch hot region, if the small interactive element exists and an element available to be output exists within a distance of 10 px around the small interactive element; and identify a region in which two or more consecutive medium-sized interactive elements, two or more consecutive image link elements or two or more consecutive text link elements locate as the touch hot region, if the two or more consecutive medium-sized interactive elements, the two or more consecutive image link elements or the two or more consecutive text link elements exist.

Specifically, the identifying module 110 performs the identification via a layout of the webpage. If a position coordinate of other element available to be output exists within the distance of 10 px around the small-image link element or the short link element and the interaction is performed in a region thereof, an incorrect region may be touched, and thus a region in which the small-image link element or the short link element locates is identified as the touch hot region; if the position coordinate of other element available to be output exists within the distance of 10 px around the small interactive element and the interaction is performed in a region thereof, two elements may mean to be output simultaneously, and thus the region in which the small interactive element locates is identified as the touch hot region; if the two or more consecutive medium-sized interactive elements, the two or more consecutive image link elements or the two or more consecutive text link elements exist in the layout of the webpage consecutively, an incorrect touch may occur and display may be overlapped with each other in a region thereof, and thus the region in which the two or more consecutive medium-sized interactive elements, the two or more consecutive image link elements or the two or more consecutive text link elements locate are identified as the touch hot region.

In an embodiment of the present disclosure, the marking module 120 is configured to mark two or more consecutive short text link elements contained in consecutive bytes less than 50 bytes, two or more consecutive short text link elements, two or three consecutive image link elements, four or more consecutive small-image link elements, and four or more consecutive medium-sized image link elements or the interactive elements contained in consecutive bytes more than or equal to 50 bytes respectively.

Specifically, the two or more consecutive short text link elements contained in the consecutive bytes less than 50 bytes are treated as a group to mark, and the two or more consecutive short text link elements contained in the consecutive bytes more than or equal to 50 bytes are treated as another group to mark, and the two or three consecutive image link elements contained in the consecutive bytes more than or equal to 50 bytes are treated as yet another group to mark, and the four or more consecutive small-image link elements contained in the consecutive bytes more than or equal to 50 bytes are treated as still yet another group to mark and the four or more consecutive medium-sized image link elements or the interactive elements contained in the consecutive bytes more than or equal to 50 bytes are treated as a last group to mark.

In an embodiment of the present disclosure, the changing module 130 is configured to: for the two or more consecutive short text link elements contained in the consecutive bytes less than 50 bytes, the two or three consecutive image link elements or the interactive elements: enlarge the two or more consecutive short text link elements contained in the consecutive bytes less than 50 bytes, the two or three consecutive image link elements or the interactive elements; increase a margin of each of the two or more consecutive short text link elements contained in the consecutive bytes less than 50 bytes, of each of the two or three consecutive image link elements or of each of the interactive elements; and adjust the layout of the more than two consecutive short text link elements contained in the consecutive bytes less than 50 bytes, the two or three consecutive image link elements or the interactive elements.

Specifically, for the two groups of marked elements, the two or more consecutive short text link elements contained in the consecutive bytes less than 50 bytes and the two or three consecutive image link elements or the interactive elements, firstly the changing module 130 enlarges main bodies of the link images or interactive documents inside the tags of the elements, then increases the margin of each of element in the page layout so as to increase the distances with respect to other elements, and then adjusts the layout of the elements to adapt the layout thereof to the enlarged elements and the increased margins.

In an embodiment of the present disclosure, the changing module 130 is further configured to: for the two or more consecutive short text link elements or the four or more consecutive small-image link elements contained in the consecutive bytes more than or equal to 50 bytes: identify important links in the two or more consecutive short text link elements or the four or more consecutive small-image link elements contained in the consecutive bytes more than or equal to 50 bytes; display the important links; hide other links; and add an unfold button configured to unfold the other links and a hiding button configured to hide the other links.

Specifically, for the two groups of elements, the two or more consecutive short text link elements or the four or more consecutive small-image link elements contained in the consecutive bytes more than or equal to 50 bytes, firstly the changing module 130 performs the identification via the link a tag first, then obtains the important links inside the tag, and displays the important links solely. Furthermore, the changing module 130 hides or folds up the other links by providing a hiding property thereto, and adds the unfold button of the hidden links and the hiding button for displaying the hidden links, which may be used to control to hide or display the hidden links.

In an embodiment of the present disclosure, the changing module 130 is further configured to: for the four or more consecutive medium-sized image link elements: adjust the layout of the four or more consecutive medium-sized image link elements; add a slidable space; and display other medium-sized image link elements which exceed a display space of a current page are displayed by sliding.

Specifically, for this group of elements, the four or more consecutive medium-sized image link elements, the layout of the four or more consecutive medium-sized image link elements in the webpage is reset firstly, and the slidable space is added in the webpage for these image link elements to slide, and thus the image link elements which exceed a display space of the current page may slide down and be provided to the user via a sliding display.

With the apparatus for displaying a webpage on the mobile terminal according to embodiments of the present disclosure, by identifying the touch hot region via the identifying module and marking the touch hot region via the marking module, a form of the elements is changed by the changing module in the touch hot region when the user touches it, which facilitates the touch and interaction of the user, and improves a usability of the mobile device and a user experience.

A non-transitory computer readable storage medium according to embodiments of the present disclosure is also provided. The non-transitory computer readable storage medium includes a computer program for executing the method for displaying a webpage on the mobile terminal according to the above embodiments of the present disclosure, when running on a computer.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present invention. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present invention. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present invention, and changes, alternatives, and modifications can be made in the embodiments without departing from spirit, principles and scope of the present invention.

What is claimed is:

1. A method for displaying a webpage on a mobile terminal, comprising:
   identifying a touch hot region in the webpage;
   marking various kinds of elements in the touch hot region;
   changing displaying modes of the various kinds of elements in the touch hot region when a user touches the touch hot region;
   displaying the webpage with the changed display mode of the various kinds of elements in the touch hot region on the mobile terminal based on a definition of each element;
   wherein identifying a touch hot region in the webpage comprises:
   identifying a region in which a small-image link element or a short link element is located as the touch hot region, if the small-image link element or the short link element exists and an element available to be output exists within a distance of 10 px around the small-image link element or the short link element;
   identifying a region in which a small interactive element is located as the touch hot region, if the small interactive element exists and an element available to be output exists within a distance of 10 px around the small interactive element; and
   identifying a region in which two or more consecutive medium-sized interactive elements, two or more consecutive image link elements or two or more consecutive text link elements is located as the touch hot region, if the two or more consecutive medium-sized interactive elements, the two or more consecutive image link elements or the two or more consecutive text link elements exist; and
   wherein:

if a width of an interactive element is less than 32 px, the interactive element is defined as the small interactive element;

if the width of the interactive element is between 32 px and 120 px, the interactive element is defined as the medium-sized interactive element;

if a width of the image link element is less than 32 px, the image link element is defined as the small-image link element;

if the width of the image link element is between 32 px and 120 px, the image link element is defined as a medium-sized image link element;

if a text length of the text link element is less than 6 bytes, the text link element is defined as a short text link element; and if the text length of the text link element is between 6 bytes and 10 bytes, the text link element is defined as a medium-sized text link element.

2. The method according to claim 1, wherein the widths of the interactive element, the image link element and the text link element on the webpage are calculated respectively according to tags of the interactive element, the image link element and the text link element in the touch hot region.

3. The method according to claim 1, wherein marking various kinds of elements in the touch hot region comprises: marking:
   A. two or more consecutive short text link elements contained in consecutive bytes less than 50 bytes,
   B. two or more consecutive short text link elements contained in consecutive bytes more than or equal to 50 bytes,
   C. two or three consecutive image link elements contained in consecutive bytes more than or equal to 50 bytes,
   D. four or more consecutive small-image link elements contained in consecutive bytes more than or equal to 50 bytes, and
   E. four or more consecutive medium-sized image link elements or two or more interactive elements contained in consecutive bytes more than or equal to 50 bytes.

4. The method according to claim 3, wherein changing displaying modes of the various kinds of elements in the touch hot region when a user touches the touch hot region comprises:
   for the:
   A. two or more consecutive short text link elements contained in the consecutive bytes less than 50 bytes, and
   B. the two or three consecutive image link elements contained in the consecutive bytes more than or equal to 50 bytes or the two or more interactive elements contained in consecutive bytes more than or equal to 50 bytes:
      enlarging:
      C. the two or more consecutive short text link elements contained in the consecutive bytes less than 50 bytes, or
      D. the two or three consecutive image link elements contained in the consecutive bytes more than or equal to 50 bytes or the two or more interactive elements contained in consecutive bytes more than or equal to 50 bytes;
   increasing a margin of each of:
      E. the two or more consecutive short text link elements contained in the consecutive bytes less than 50 bytes, or
      F. the two or three consecutive image link elements contained in the consecutive bytes more than or equal to 50 bytes, or the two or more interactive elements contained in consecutive bytes more than or equal to 50 bytes; and
   adjusting a layout of:
      G. the two or more consecutive short text link elements contained in the consecutive bytes less than 50 bytes, or
      H. the two or three consecutive image link elements contained in the consecutive bytes more than or equal to 50 bytes, or the two or more interactive elements contained in consecutive bytes more than or equal to 50 bytes.

5. The method according to claim 3, wherein changing displaying modes of the various kinds of elements in the touch hot region when a user touches the touch hot region comprises:
   for the two or more consecutive short text link elements or the four or more consecutive small-image link elements contained in the consecutive bytes more than or equal to 50 bytes respectively:
   identifying important links in the two or more consecutive short text link elements or the four or more consecutive small-image link elements contained in the consecutive bytes more than or equal to 50 bytes respectively;
   displaying the important links;
   hiding other links; and
   adding an unfold button configured to unfold the other links and a hiding button configured to hide the other links.

6. The method according to claim 3, wherein changing displaying modes of the various kinds of elements in the touch hot region when a user touches the touch hot region comprises:
   for the four or more consecutive medium-sized image link elements:
   adjusting a layout of the four or more consecutive medium-sized image link elements;
   adding a slidable space; and
   displaying by sliding other medium-sized image link elements which exceed a display space of a current page.

7. An apparatus for displaying a webpage on a mobile terminal, comprising:
   one or more processors configured to execute one or more software modules, the one or more software modules including:
   an identifying module, configured to identify a touch hot region in the webpage;
   a marking module, configured to mark various kinds of elements in the touch hot region;
   a changing module, configured to change displaying modes of the various kinds of elements in the touch hot region when a user touches the touch hot region and display the webpage with the changed display mode of the various kinds of elements in the touch hot region on the mobile terminal based on a definition of each element; and
   a defining module configured to:
      define an interactive element as a small interactive element, if a width of the interactive element is less than 32 px;
      define the interactive element as a medium-sized interactive element, if the width of the interactive element is between 32 px and 120 px;

define an image link element as a small-image link element, if a width of the image link element is less than 32 px;

define the image link element as a medium-sized image link element, if the width of the image link element is between 32 px and 120 px;

define a text link element as a short text link element, if a text length of the text link element is less than 6 bytes;

define the text link element as a medium-sized text link element, if the text length of the text link element is between 6 bytes and 10 bytes, wherein the identifying module is configured to:

identify a region in which the small-image link element or the short link element is located as the touch hot region, if the small-image link element or the short link element exists and an element available to be output exists within a distance of 10 px around the small-image link element or the short link element;

identify a region in which the small interactive element is located as the touch hot region, if the small interactive element exists and an element available to be output exists within a distance of 10 px around the small interactive element; and identify a region in which two or more consecutive medium-sized interactive elements, two or more consecutive image link elements or two or more consecutive text link elements is located as the touch hot region, if the two or more consecutive medium-sized interactive elements, the two or more consecutive image link elements or the two or more consecutive text link elements exist.

8. The apparatus according to claim 7, further comprising:
a calculating module, configured to calculate the widths of the interactive element, the image link element and the text link element on the webpage respectively according to tags of the interactive element, the image link element and the text link element in the touch hot region.

9. The apparatus according to claim 7, wherein the marking module is configured to:
A. mark two or more consecutive short text link elements contained in consecutive bytes less than 50 bytes;
B. mark two or more consecutive short text link elements contained in consecutive bytes more than or equal to 50 bytes;
C. mark two or three consecutive image link elements contained in consecutive bytes more than or equal to 50 bytes;
D. mark four or more consecutive small-image link elements contained in consecutive bytes more than or equal to 50 bytes; or
E. mark four or more consecutive medium-sized image link elements or two or more interactive elements contained in consecutive bytes more than or equal to 50 bytes.

10. The apparatus according to claim 9, wherein the changing module is configured to:
for the:
A. two or more consecutive short text link elements contained in the consecutive bytes less than 50 bytes, and
B. the two or three consecutive image link elements contained in consecutive bytes more than or equal to 50 bytes or the two or more interactive elements contained in consecutive bytes more than or equal to 50 bytes:
enlarge:
C. the two or more consecutive short text link elements contained in the consecutive bytes less than 50 bytes, or
D. the two or three consecutive image link elements contained in consecutive bytes more than or equal to 50 bytes or the two or more interactive elements contained in consecutive bytes more than or equal to 50 bytes;
increase a margin of each of:
E. the two or more consecutive short text link elements contained in the consecutive bytes less than 50 bytes, or
F. the two or three consecutive image link elements contained in consecutive bytes more than or equal to 50 bytes or the two or more interactive elements contained in consecutive bytes more than or equal to 50 bytes; and
adjust a layout of:
G. the two or more consecutive short text link elements contained in the consecutive bytes less than 50 bytes, or
H. the two or three consecutive image link elements contained in consecutive bytes more than or equal to 50 bytes or the two or more interactive elements contained in consecutive bytes more than or equal to 50 bytes.

11. The apparatus according to claim 9, wherein the changing module is configured to:
for the two or more consecutive short text link elements or the four or more consecutive small-image link elements contained in the consecutive bytes more than or equal to 50 bytes respectively:
identify important links in the two or more consecutive short text link elements or the four or more consecutive small-image link elements contained in the consecutive bytes more than or equal to 50 bytes respectively;
display the important links;
hide other links; and
add an unfold button configured to unfold the other links and a hiding button configured to hide the other links.

12. The apparatus according to claim 9, wherein the changing module is configured to:
for the four or more consecutive medium-sized image link elements:
adjust a layout of the four or more consecutive medium-sized image link elements;
add a slidable space; and
display by sliding other medium-sized image link elements which exceed a display space of a current page.

* * * * *